(12) United States Patent
Webb (10) Patent No.: US 7,172,687 B2
(45) Date of Patent: Feb. 6, 2007

(54) WASTEWATER TREATMENT SYSTEM (75) Inventor: James Webb, Grass Valley, CA (US)

(73) Assignee: SO2 Solutions, LLC, Sparks, NV (US)

( * ) Notice: Subject to any disclaimer, the term of this patent is extended or adjusted under 35 U.S.C. 154(b) by 103 days.

(21) Appl. No.: 10/791,685

(22) Filed: Mar. 2, 2004

(65) Prior Publication Data
US 2005/0011820 A1 Jan. 20, 2005

Related U.S. Application Data (60) Provisional application No. 60/452,515, filed on Mar. 6, 2003.

(51) Int. Cl.
C02F 1/70 (2006.01)
(52) U.S. Cl. ............ 210/96.1; 210/151; 210/192; 210/194; 210/202; 210/205; 210/416.1; 422/161; 422/234
(58) Field of Classification Search ............ 210/96.1, 210/181, 192, 199, 202, 205, 416.1, 143, 210/151, 194, 418, 743, 757; 422/161; 251/129.05, 251/129.08
See application file for complete search history.

(56) References Cited

U.S. PATENT DOCUMENTS

| | | | | |
|---|---|---|---|---|
| 2,310,187 A | * | 2/1943 | Axelrad et al. ............ 210/739 |
| 3,948,774 A | * | 4/1976 | Lindman ............ 210/192 |
| 4,526,771 A | | 7/1985 | Forbush et al. | |
| 5,948,261 A | * | 9/1999 | Pressley ............ 210/609 |
| 6,080,368 A | | 6/2000 | Jackson | |
| 6,248,299 B1 | | 6/2001 | Jackson | |
| 6,346,198 B1 | * | 2/2002 | Watson et al. ............ 210/739 |
| 6,500,391 B1 | | 12/2002 | Jackson | |
| 6,506,347 B1 | | 1/2003 | Jackson | |
| 6,689,326 B1 | | 2/2004 | Jackson | |
| 2003/0211018 A1 | | 11/2003 | Jackson | |
| 2005/0109705 A1 | * | 5/2005 | Webb ............ 210/743 |

OTHER PUBLICATIONS

*Assembly Drawings and Part Detail Drawings of Harmon Devices on sale at least as early as Mar. 5, 2002*, pp. 1-38.
*Installation Instructions for Harmon Devices on sale at least as early as Mar. 5, 2002*, pp. 1-13.

* cited by examiner

Primary Examiner—Matthew O. Savage
(74) Attorney, Agent, or Firm—Pate Pierce & Baird (57) ABSTRACT A water treatment system for treating water. The water treatment system includes a primary water treatment station and a solid-based sulfurous generator downstream from the primary water treatment station for producing aqueous sulfurous acid for further treatment of the water. In one embodiment, the solid-based sulfurous generator includes a hydraulic air inlet shut off valve safety system for automatically reducing the combustion air to the sulfurous generator when water is not delivered to the solid-based sulfurous generator. Also, in one embodiment, the water treatment system includes a control system that monitors the pH of the treated water to control the water flow rate through the solid-based sulfurous generator to achieve the desired concentration of sulfurous acid in the water being treated.

23 Claims, 9 Drawing Sheets

WASTEWATER TREATMENT SYSTEM

RELATED APPLICATIONS

This application claims priority to co-pending U.S. Provisional Patent Application Ser. No. 60/452,515 filed on Mar. 6, 2003.

BACKGROUND

1. Field of the Invention

The present invention relates generally to water treatment systems and, more particularly, to a water treatment system which utilizes aqueous sulfurous acid produced by a solid sulfur-based sulfurous generator for further treatment of the water.

2. Description of the Prior Art

In wastewater treatment facilities, a main stream of wastewater typically is treated with a chlorine-containing compound, such as sodium hypochlorite, to neutralize bacteria in the wastewater stream. It is undesirable to under treat the wastewater stream because active bacteria will thus remain in the wastewater stream. It is also undesirable to over treat the wastewater with chlorine because a residual chlorine level in the wastewater stream will be detrimentally high. Additionally, the chlorine or other treatment fluid is wasted and additional chemical is typically needed to neutralize the excess chlorine.

Wastewater treatment facilities can incur fines for releasing wastewater, which is either under treated or over treated with chlorine containing compounds. Wastewater treatment facilities additionally suffer financially from the unnecessary use of excess chlorine and chlorine neutralizing chemicals, such as sulfur dioxide when the chlorination/de-chlorination process is not operating optimally.

Many advanced wastewater treatment systems include a residual chlorine analyzer downstream from the chlorinator, which monitors the levels of chlorine residual remaining in the wastewater stream. One such system is disclosed in U.S. Pat. No. 6,346,198, issued to Watson et al., which is hereby incorporated by reference in its entirety. Controllers may utilize the results of this downstream analyzer to provide a feedback signal to the chlorinator. In essence, if an amount of residual chlorine is too high at the downstream analyzer, the chlorinator receives a feedback signal, which decreases the rate of introduction of chlorine. If the analyzer detects that no chlorine or too little chlorine remains, indicative that not all of the bacteria has been neutralized, the feedback signal may cause the chlorinator to increase the rate with which it introduces chlorine.

When compressed sulfur dioxide gas is used to neutralize the excess chlorine, there is not only its cost but also the danger associated with its use. Sulfurous acid generators have been used for other water treatment applications such as treating the irrigation water used by golf courses and agricultural facilities. Two such generators are described in U.S. Pat. No. 4,526,771, issued to Forbush et al. and U.S. Pat. No. 6,248,299, issued to Jackson. Both of these patents are hereby incorporated by reference in their entirety. However, these generators are not adapted for wastewater treatment nor do they typically include the necessary safety systems that would be required.

Thus, there remains a need for a new and improved water treatment system which utilizes aqueous sulfurous acid produced by a solid sulfur-based sulfurous generator for further treatment of the water while, at the same time, includes a shut-off safety system to prevent leakage of molten sulfur from the sulfurous generator.

BRIEF SUMMARY OF THE INVENTION

The present invention is directed to a water treatment system for treating water. The water treatment system includes a primary water treatment station and a solid-based sulfurous generator downstream from the primary water treatment station for producing aqueous sulfurous acid for further treatment of the water. In one embodiment, the solid-based sulfurous generator includes a hydraulic air-inlet shut off valve safety system. Also, the water treatment system may include a control system that monitors the pH of water being treated to control the water flow rate through the generator to achieve the desired concentration of sulfurous acid in the water being treated.

The primary waste treatment station is generally conventional in design and includes settling tanks and holding cells for receiving the water to be treated. The water treatment system may further include a secondary water treatment station including aeration tanks and clarifiers downstream from the primary water treatment station. Finally, the water treatment system may further include a tertiary water treatment station downstream from the primary water treatment station.

In one embodiment, the aqueous sulfurous acid is produced by a solid-based sulfurous generator having a hydraulic air inlet shut off valve safety system for automatically reducing the combustion air to the generator when water is not delivered to the generator. In one embodiment, the solid-based sulfurous generator includes a solid sulfur supply, a burning chamber for burning the solid sulfur, an air inlet for providing combustion air to the burning chamber, a hot $SO_2$ gas outlet, and a mixing and collection chamber.

The burning chamber may further include a water-cooled bottom plate for solidifying molten sulfur in the burning chamber to form a seal. The sealing bottom plate is removable for cleaning the burning chamber. The burning chamber may include an igniter, such as a cal-rod inserted into the burning chamber.

In one embodiment, a negative pressure source downstream from the hot $SO_2$ gas outlet draws $SO_2$ gas out of the burning chamber and combustion air into the burning chamber. The negative pressure source may be a venturi, an air amplifier, or a water aspirator. In one embodiment, the water inlet port on the aspirator may be offset to maximize the "swirling" effect of the water and the negative pressure created by the aspirator. In addition to creating negative pressure to remove $SO_2$ gas from the burning chamber and to draw combustion air into the burning chamber, the introduction of water through the aspirator also serves to mix the $SO_2$ gas with water and convert it into sulfurous acid ($H_2SO_3$).

Also, in one embodiment, a scrub tower is located downstream from the hot $SO_2$ gas outlet for capturing any residual $SO_2$ gas that was not converted into sulfurous acid by the aspirator. The scrub tower includes a high surface area reaction surface and a supply of water for reacting with the residual $SO_2$ gas. In one embodiment, high surface area reaction surface is a moisture-resistant material, such as rashing rings formed from plastic tubing. In one embodiment, the rashing rings have a length between about 0.5 and 1.5 inches and a diameter between about 0.5 and 1.5 inches. In addition, the flow rate of the water into the scrub tower may be greater than about 80 GPM at greater than about 20

PSI to optimize the conversion of residual $SO_2$ gas into sulfurous acid. This is also referred to as optimum tail removal efficiency.

The scrub tower may further include a vapor recovery means. The vapor recovery means includes an air inlet for providing additional air into the scrub tower, an air mover for removing air and vapors from the scrub tower, and a percolation chamber for receiving and dissipating the air and vapors. In one embodiment, the air mover is a second water aspirator.

In one embodiment, the control system includes a pH sensor for sensing the pH of the water being treated. It also includes a controller connected to the pH sensor for receiving a signal representative of the pH, which it compares to the desired water pH. It then provides an output control signal to a flow control means connected to the controller for adjusting the water flow rate through the solid-based sulfurous generator to achieve the desired concentration of sulfurous acid in the water being. In one embodiment, the flow control means includes either a conventional water valve or a variable frequency drive (VFD). The VFD may control the flow rate of water delivered by a pump system by adjusting the pump speed, said pump being located between the primary water treatment station and the solid-based sulfurous generator. As an alternative, the VFD may also adjust a valve opening to control the water flow rate through the valve, said valve being located between the primary water treatment station and the solid-based sulfurous generator.

The control system may further include a feed load cell for determining the weight of sulfur being fed to the sulfurous generator and a timer circuit for calculating the feed burn rate based on the change in the output of the feed load cell over time. Also, the control system may further include a flow meter for measuring the flow rate of water through the solid-based sulfurous generator and a timer for selectively starting and stopping the solid-based sulfurous generator. In addition, the system may also include a residual chlorine analyzer, such as taught by U.S. Pat. No. 6,346,198, issued to Watson et al. located, for example, near the pH sensor.

Accordingly, one object of the present invention is to provide a water treatment system for treating water, the water treatment system includes: a primary water treatment station; and a solid-based sulfurous generator downstream from the primary water treatment station for producing aqueous sulfurous acid for further treatment of the water.

Another object of the present invention is to provide an apparatus for producing aqueous sulfurous acid, the apparatus includes: a solid-based sulfurous generator; and a hydraulic air inlet shut off valve safety system for automatically reducing the combustion air to the sulfurous generator when water is not delivered to the sulfurous generator.

Still another object of the present invention is to provide a water treatment system for treating water, the water treatment system includes: a primary water treatment station; a solid-based sulfurous generator downstream from the primary water treatment station for producing aqueous sulfurous acid for further treatment of the water, the solid-based sulfurous generator including a hydraulic air inlet shut off valve safety system for automatically reducing the combustion air to the sulfurous generator if water is not delivered to the sulfurous generator; and a control system that monitors the pH of the water being treated to control the water flow rate through the solid-based sulfurous generator to achieve the desired concentration of sulfurous acid in the water being treated.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but is merely representative of the presently preferred embodiments of the invention.

In the following description, like reference characters designate like or corresponding parts throughout the several views. Also in the following description, it is to be understood that terms such as "forward," "rearward," "left," "right," "upward," "downward," and the like are words of convenience and are not to be construed as limiting terms.

Figure 1:
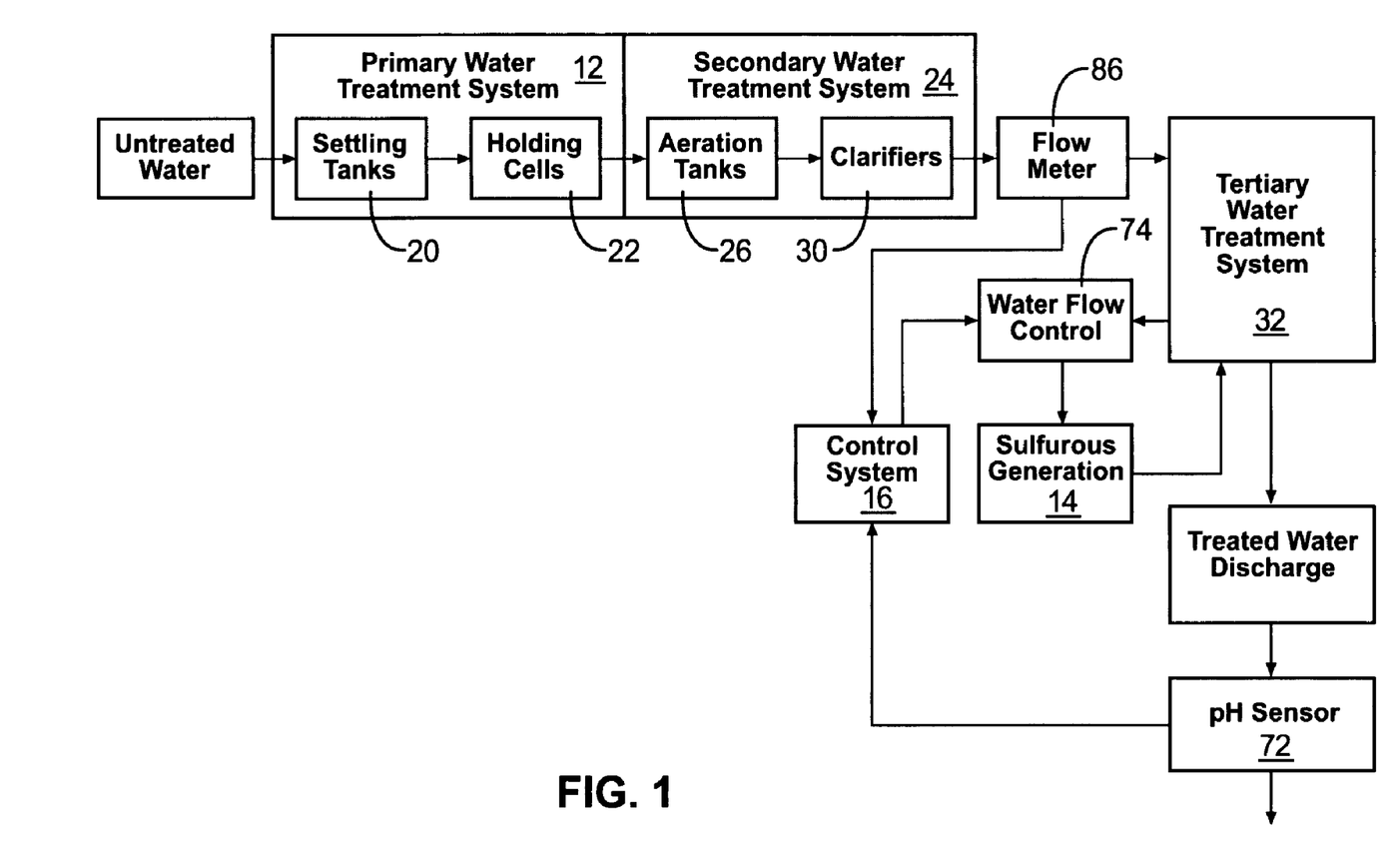
FIG. 1 is a water treatment system constructed according to the present invention.

Referring to FIG. 1, a water treatment system is shown constructed according to the present invention. The water treatment system may include a primary water treatment station 12, a solid-based sulfurous generator 14 for producing aqueous sulfurous acid, and a control system 16 that monitors the pH of the water being treated. The data gathered by the control system 16 may be used to adjust a water flow control means 74 and control the water flow rate through the solid-based sulfurous generator 14 to achieve the desired concentration of sulfurous acid in the water being treated.

The primary water treatment station 12 is generally conventional in design and includes settling tanks 20 and holding cells 22. The primary settling tank provides for removal of solids that are heavy and sink to the bottom, as well as materials that float to the surface, such as oil and grease. The settling tank 20 holds the water being treated for several hours. During that time, most of the heavy solids fall to the bottom of the tank where they become a thick slurry, known as primary sludge. The material that floats is skimmed from the surface of the tanks. Both the primary sludge and skimmed materials may be pumped to a solids treatment process in a conventional manner.

Downstream from the primary water treatment station 12 may be a secondary water treatment station 24. The secondary water treatment station 24 may include aeration tanks 26 and clarifiers 30. Treated water flowing out of the primary water treatment station 12 often still contains some solids and dissolved materials. The secondary water treatment station 24 may use a known process, such as activated sludge, to create an environment where microorganisms, such as bacteria, consume the remaining organic materials in the water being treated. For example, the aeration tanks 26 may use air bubbles to provide both mixing and the oxygen needed by the microorganisms.

The microorganisms that grow in the aeration tanks 26 eventually fall to the bottom of the tanks. In the activated sludge process, most of these microorganisms are then cycled back to the aeration tanks 26 where they continue to grow and remove organic materials from the water being treated. Excess microorganisms that grow in the secondary water treatment station 24 are removed from the activated sludge process and the final clarifiers 30, and may be pumped to a separate solids treatment station (not shown) for treatment and disposal.

The the water treatment system of the present invention includes a final or tertiary water treatment station 32. The tertiary water treatment station may include conventional sand filters to remove small solid particles. In addition, the treated water may be disinfected, usually by chlorine, to kill disease causing bacteria and viruses. Compressed $SO_2$ gas may be used in this process to de-chlorinate the water after the chlorine has been introduced. However, in the present invention, aqueous sulfurous acid is added from solid-based sulfurous generator 14. A solid-based system may offer advantages in safety and cost effectiveness over using compressed $SO_2$ gas.

As will be discussed in more detail subsequently, the production of aqueous sulfurous acid by the solid-based sulfurous generator 14 may be controlled by control system 16. While discussed in more detail later, one example of a control system 16 is shown in FIG. 1. The flow rate of water into the tertiary water treatment station 32 may be measured by flow meter 86. This information may then be used to control the flow rate of water through the solid-based sulfurous generator to create the desired concentration of sulfurous acid in the water being treated.

In one embodiment, the control system 16 may also sense the pH of the treated water using pH sensor 72 to provide feedback to control the water flow rate through the generator 14. Also, in one embodiment, the control system 16 may sense the excess chlorine level in the wastewater to provide a further feedback to control the water flow rate through the solid-based sulfurous generator 14 to achieve the desired concentration of sulfurous acid in the water being treated. Following treatment, the water may be discharged to an ocean, river, lake, or stream or used for irrigation purposes.

Figure 2:
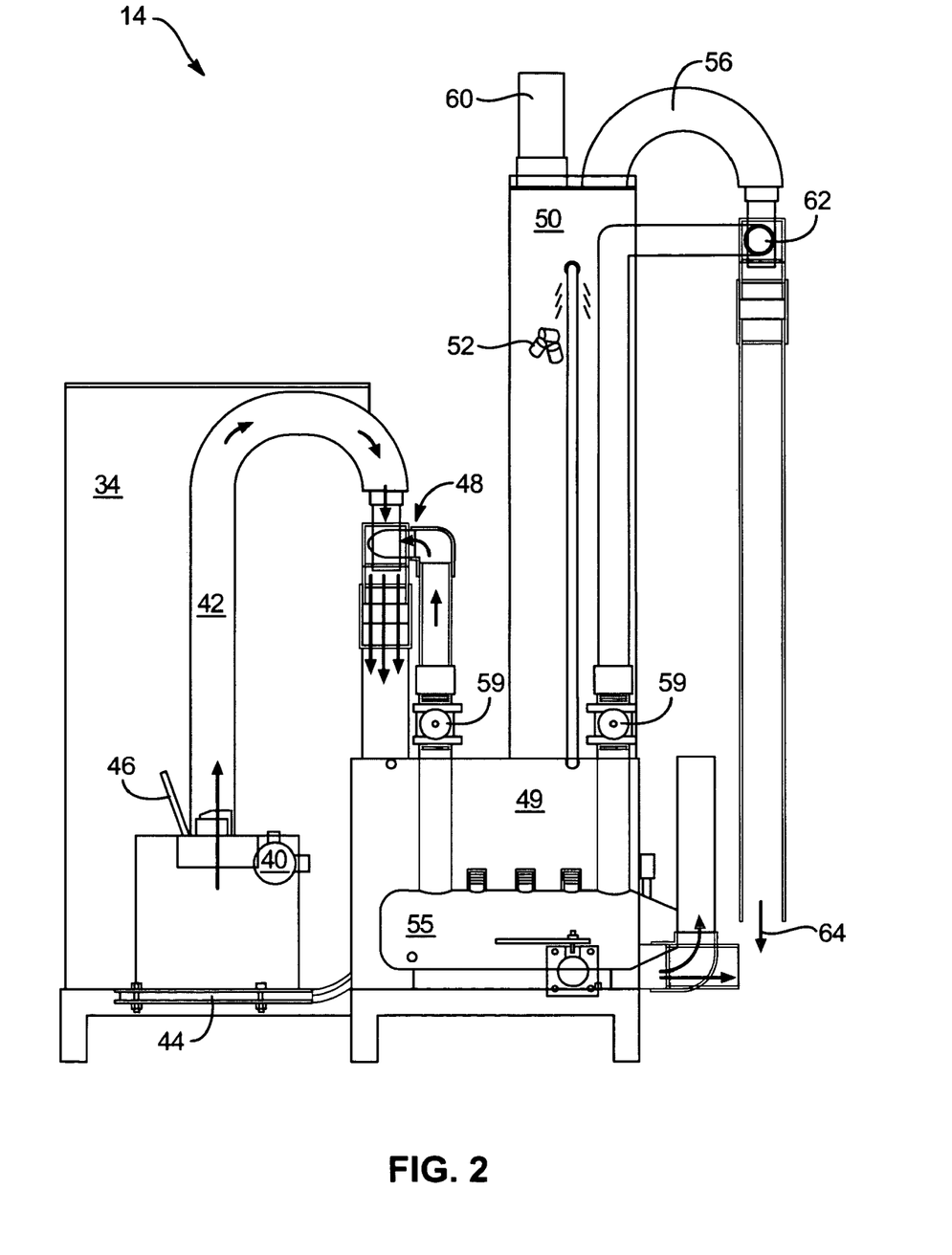
FIG. 2 is an front view of the solid-based sulfurous generator.

Referring to FIG. 2, there is shown a front view of the solid-based sulfurous generator 14. In one embodiment, the solid-based sulfurous generator 14 may include a solid sulfur supply 34, a burning chamber 36, and an air inlet 40 for providing combustion air to the burning chamber 36. Hot $SO_2$ gas exits the burning chamber 36 through the gas outlet 42 where it is subsequently mixed and collected in mixing and collection chamber 49.

The burning chamber 36 may include a water-cooled sealing plate 44, which forms the bottom of the burning chamber 36. The cooler temperature of the ring causes the molten sulfur formed in the burning chamber 36 to solidify and seal the bottom of burning chamber 36 during normal operation. However, this "gasket-free" seal may also allows the bottom plate of the burning chamber 36 to be easily removed for cleaning and maintenance of the burning chamber 36. In one embodiment, the solid sulfur received in the burning chamber 36 from the solid sulfur supply 34 is initially ignited by an electrically powered igniter 46, such as a cal-rod.

Figure 4:
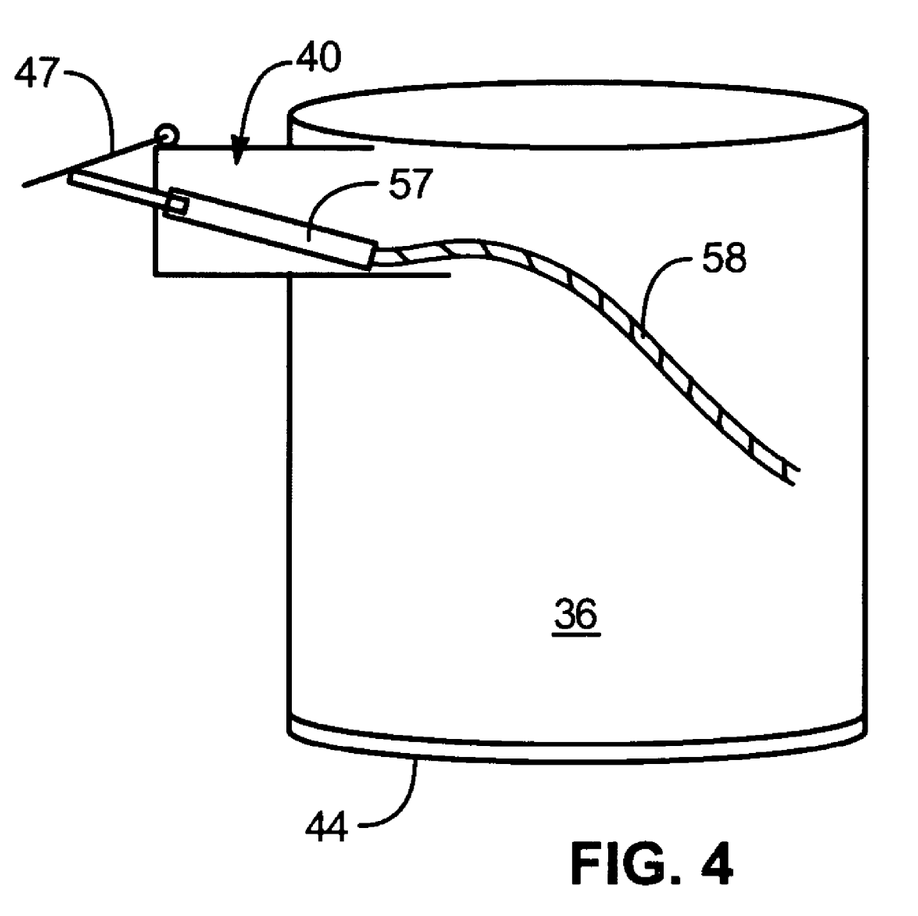
FIG. 4 is an enlarged partial-side view of the solid-based sulfurous generator shown in FIG. 2, illustrating the hydraulic air inlet shut off valve safety system.

As best seen in FIG. 4, in one embodiment, the solid-based sulfurous generator 14 may include a hydraulic air inlet shut off valve safety system 47, 57, 58. The hydraulic air inlet shut off valve safety system 47, 57, 58 may use water pressure, delivered by water line 58, to extend a piston in the hydraulic cylinder 57 which opens the valve 47 on the air inlet 40 allowing air to enter the burning chamber 36. When water stops being delivered to the generator 14, the piston retracts. Gravity may then close the valve 47 reducing the flow of air and oxygen through the air inlet 40. The reduced supply of oxygen causes combustion to cease in the burning chamber 36. Without this safety system 47, 57, 58, the molten sulfur may continue to burn and possibly leak from the generator 14 creating a safety hazard and possibly a fire.

Referring back to FIG. 2, the solid-based sulfurous generator 14 preferably is operated using a negative pressure source 48 for drawing $SO_2$ gas out of the burning chamber 36 and combustion air into burning chamber 36 to produce the aqueous sulfurous acid mixture. The negative pressure source 48 may be downstream from the burning chamber 36, significantly reducing the likelihood of $SO_2$ gas escaping from the burning chamber. The negative pressure source 48 can be any or several types of air movers, including venturis and air amplifiers.

In one embodiment (see FIG. 8) the negative pressure source 48 for the burning chamber 36 may be a kinetic jet-type water aspirator with an offset water inlet port (see FIG. 9), such as a GT-300 Main Aspirator available from Aqua $SO_2$, Inc. of Grass Valley, Calif. The aspirator 48 may operate by moving water through directed jets, which creates a negative pressure upstream from the jets. In addition, since the purpose of the solid-based sulfurous generator 14 is to produce aqueous sulfurous acid, the water aspirator 48 also introduces water and mixes it with the $SO_2$ gas to produce sulfurous acid.

By designing the aspirator 48 with an offset water inlet port (see FIG. 9), a greater "swirling" effect may be produced which increases the negative pressure created by the aspirator 48 when compared to aspirators with non-offset or centered water inlet ports. This results in higher burn rates at given flow rates when compared to non-offset aspirators of the same size. In addition, the greater "swirling" effect mixes more $SO_2$ gas with water leaving less residual $SO_2$ gas to be captured in the scrub tower when compared to non-offset aspirators of the same size, which may result in fewer $SO_2$ emissions.

Figure 8:
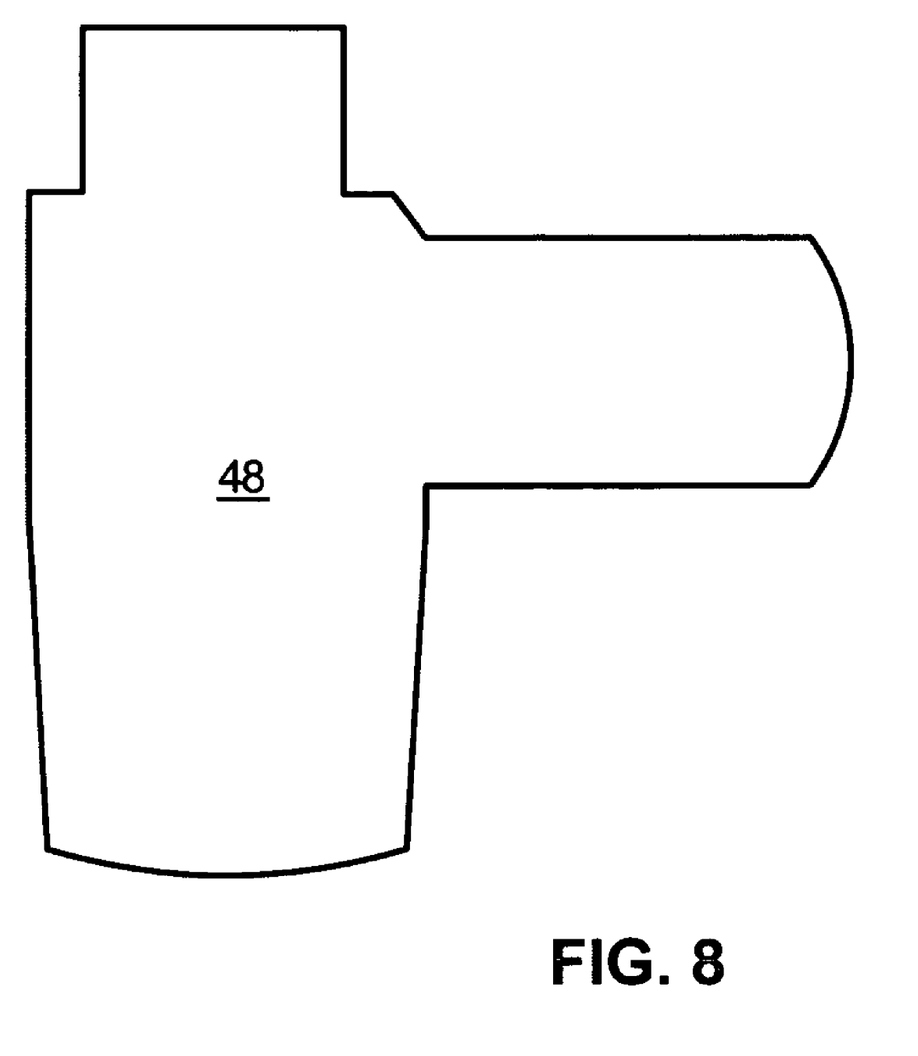
FIG. 8 is a side view a water aspirator.
Figure 9:
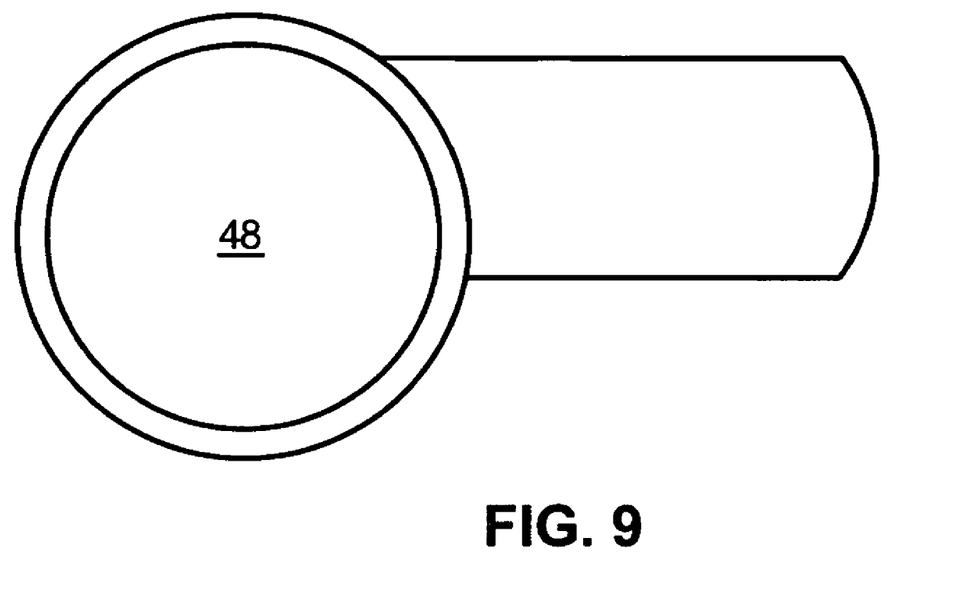
FIG. 9 is a top view of a water aspirator illustrating the offset water inlet port.

This aspirator 48, which removes $SO_2$ gas from the burning chamber and draws air and oxygen into the burning chamber by creating a negative pressure source, may also be referred to as the "main aspirator" (to distinguish it from a vapor-recovery aspirator).

Figure 3:
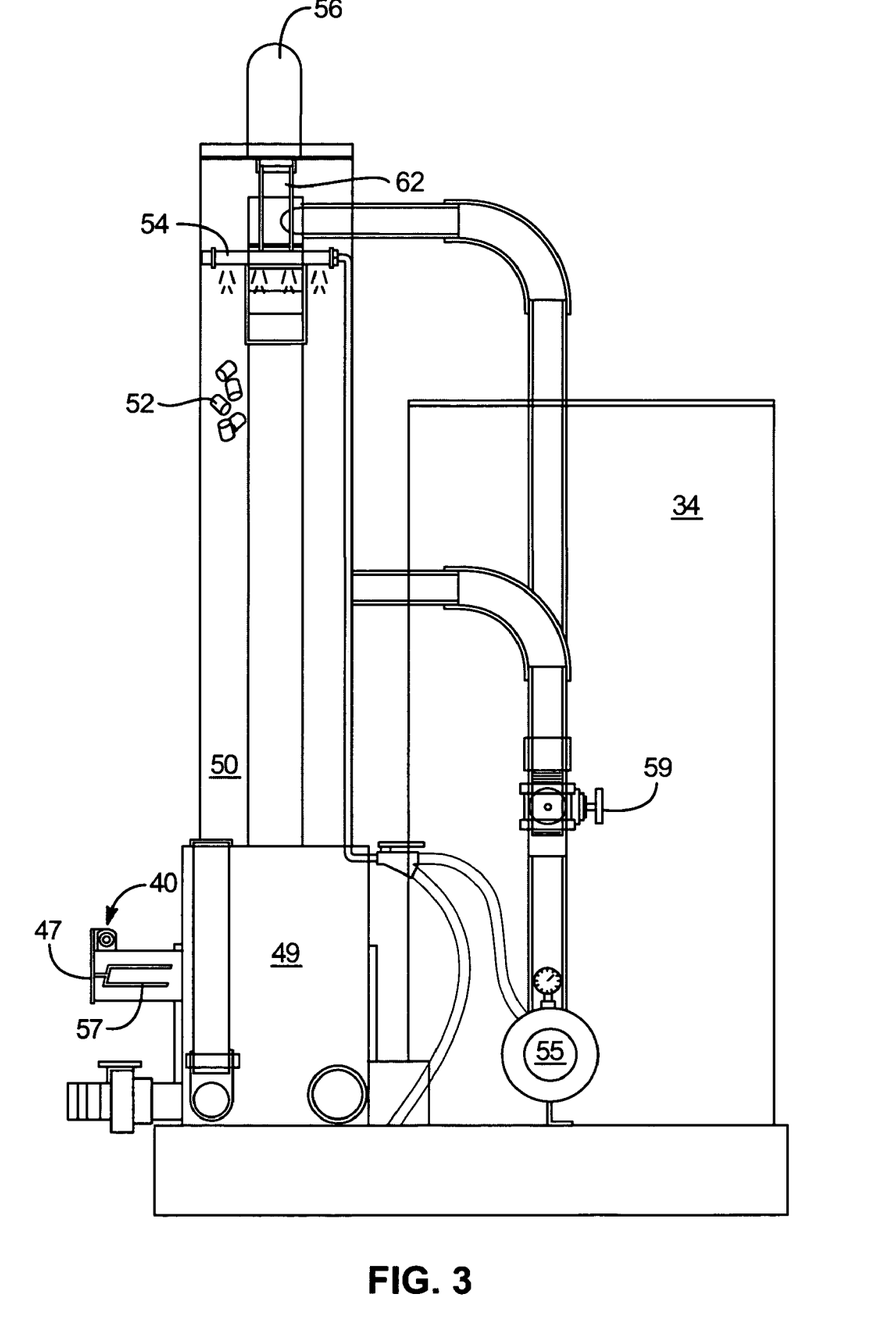
FIG. 3 is a right-side view of the solid-based sulfurous generator shown in FIG. 2.

FIG. 3 is a right-side view of the solid-based sulfurous generator that was shown in FIG. 2, illustrating the scrub tower 50 and vapor recovery means 56. The scrub tower 50 includes a high surface area, reactive surface material 52 and a supply of water 54 for mixing with any residual $SO_2$ that arises from the mixing and collection chamber 49. In one embodiment, the water is supplied from a manifold 55 which also supplies water to the main aspirator 48, the air mover 62 and the burning chamber cooling ring 36. Adjustable gate valves 59 and conventional pressure gauges may be used to adjust the flow of water through both the main aspirator 48, the air mover 62, and the scrub tower 50.

In one embodiment, the high surface area, reactive surface material 52 is a moisture-resistant material such as polyethylene plastic. These materials are preferably formed from a tube of plastic, which is cut into lengths of between about ½ and 1½ inches for a tube having a diameter between about ½ and 1½ inches to form "rashing" rings. In the most preferred embodiment, the rashing rings are formed from ¾ inch inner diameter PVC pipe cut into 1¼ inch lengths.

Figure 5:
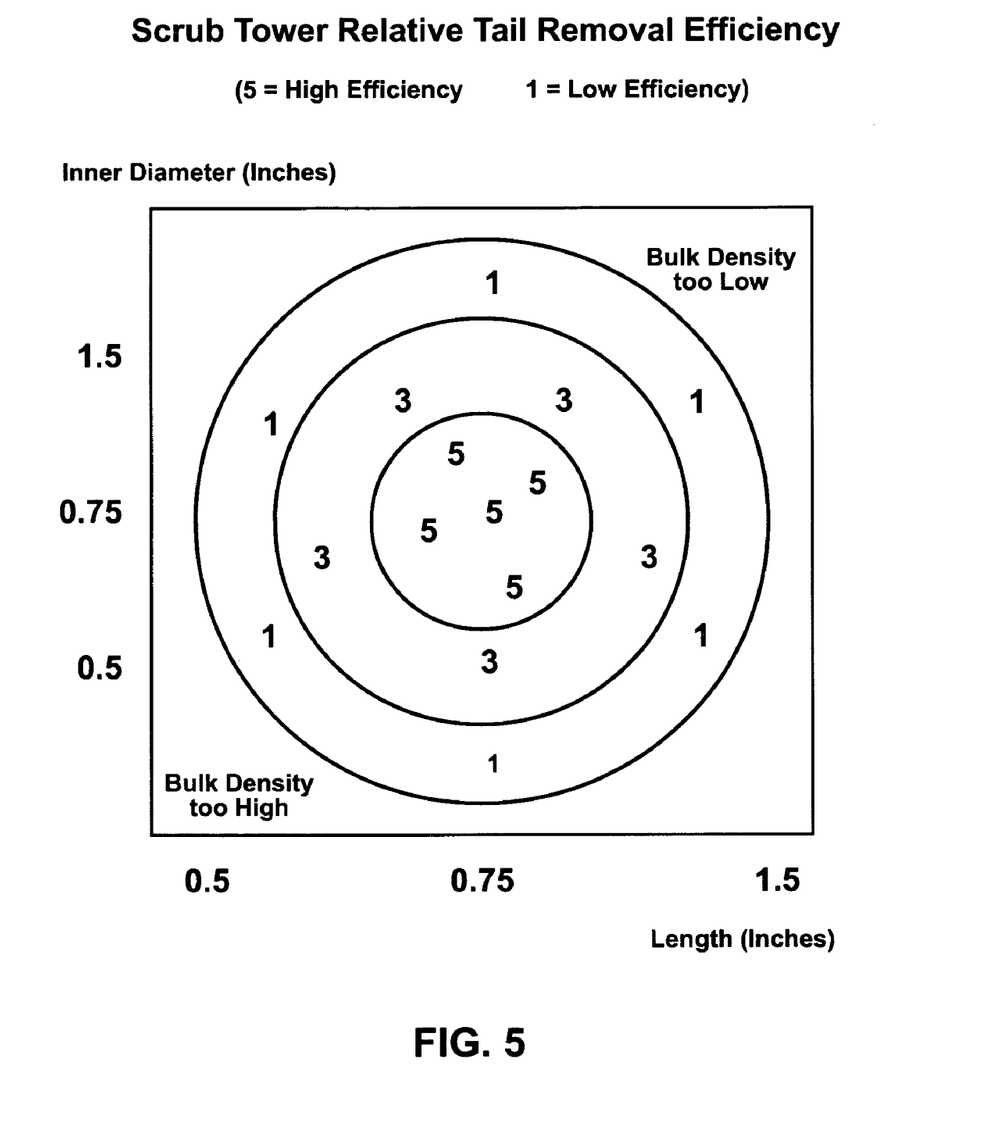
FIG. 5 is a graphical representation of relative tail removal efficiency of the scrub tower as a function of inner diameter and length of the rashing rings.

FIG. 5 provides a graphical representation of relative "tail removal efficiency" of the scrub tower 50 as a function of inner diameter and length of the rashing rings. (Tail removal efficiency being defined as the efficiency of converting residual $SO_2$ into sulfurous acid or H2SO3. The residual $SO_2$ being any $SO_2$ gas that was not converted into $H_2SO_3$ by the introduction of water through the main aspirator 48.) As may be seen in FIG. 5, the maximum efficiency for tail removal is generally in the range of a ¾ inch inner diameter and a ¾ inch length. Smaller sized rashing rings result in too high a bulk density for the rings and may not allow the water that is capturing the $SO_2$ gas to pass through the rings without puddling. In addition, as the rashing rings become too large and too long, the bulk density becomes too low and there is not sufficient surface area to efficiently capture the residual $SO_2$ gas. Moreover, having approximately the same diameter and length produces a random and torturous path through the high surface area, reactive surface 52, which is desirable for improved efficiency.

Figure 6:
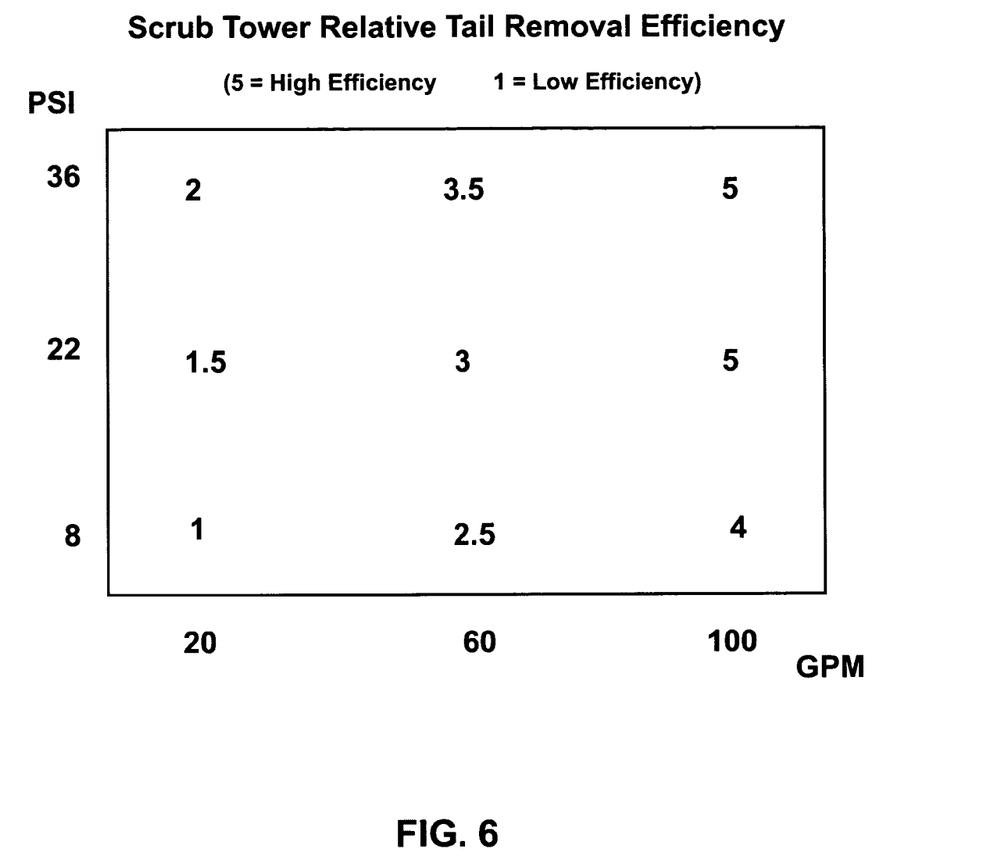
FIG. 6 is a graphical representation of relative tail removal efficiency of the scrub tower as a function of the water pressure and flow rate of the water into the scrub tower.

As best seen in FIG. 6, there is shown a graphical representation of relative tail removal efficiency of the scrub tower 50 as a function of the water pressure and flow rate of the water into the scrub tower. As may be seen in FIG. 6, the maximum efficiency for tail removal is generally in the range of greater than about 20 PSI and a flow rate of greater than about 80 GPM. While not intended to limit the scope of the present invention, it is believed that this is primarily due to kinetic mixing. Consequently, lower flow rates at higher pressure and higher flow rates at lower pressures may perform similarly.

Referring back to FIG. 2, the vapor recovery means 56 is attached through the top of scrub tower 50. The vapor that the vapor recovery means is intended to recover, is primarily a mixture of water vapor and diatomic nitrogen, which remains after the oxygen in the combustion air is combined with the burning sulfur. The mixture of water vapor and diatomic nitrogen appears as a "white" plume, which may be cosmetically unappealing to some users. The vapor recovery means 56 includes an air inlet 60 and an air mover 62, possibly a second water aspirator, for moving air through the scrub tower 50 and out of the scrub tower to a percolation chamber 64 (not shown). In one embodiment, the percolation chamber 64 is a length of conventional drainpipe buried under the earth, which provides sufficient time for the diatomic nitrogen to recombine and loose its "white" appearance.

Figure 7:
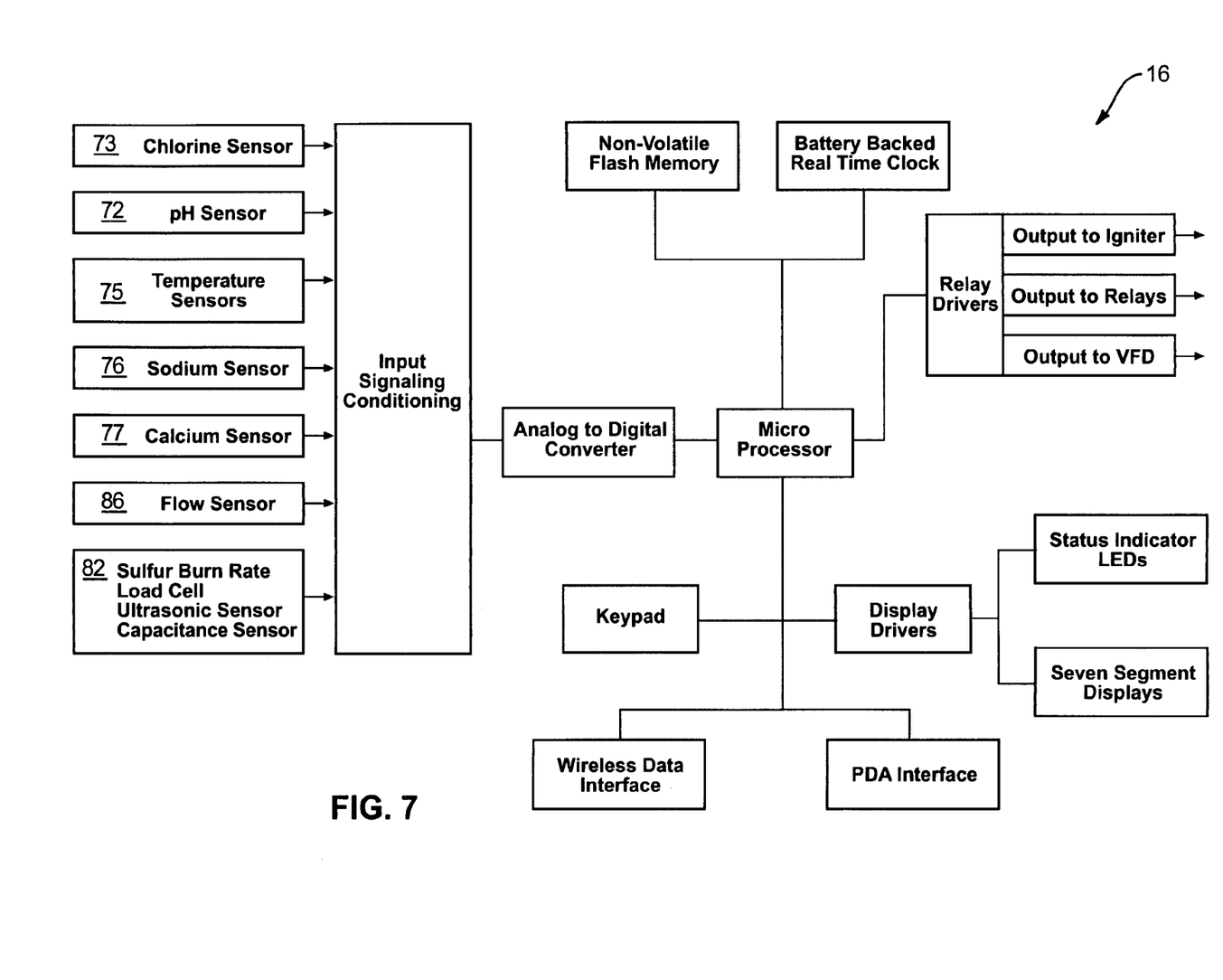
FIG. 7 is a function block diagram of the control system, which controls the production of aqueous sulfurous acid.

FIG. 7 displays a function block diagram of the control system 16 for the sulfurous generator. The control system 16 may monitor the pH of the treated water and adjust the flow rate of the generator 14 to maintain the water pH at a preset level. The control system 16 may be microprocessor based and include a pH sensor 72 and a flow rate controller 74. The pH sensor 72 may sense the pH of the treated water and send this information to the microprocessor. The microprocessor may compare the sensed pH to the desired pH setting and provide an output control signal to the flow rate controller 74 indicating whether the water pH should be higher or lower. The flow rate controller 74 may then adjust the pump speed, which, in turn, may affect the flow of water through the generator 14 and the amount of aqueous sulfurous acid produced by the solid-based sulfurous generator 14. As an alternative to adjusting the pump speed, the flow rate controller 74 may also adjust a valve opening to control the flow of water through the generator 14 and the amount of aqueous sulfurous acid that is produced.

In one embodiment, the flow rate controller 74 is a variable frequency drive (hereinafter "VFD") for controlling the water flow rate that is delivered to the solid-based sulfurous generator 14. As an alternative, the VFD may adjust a valve opening to control the flow rate, said valve being located between a pump system and the solid-based sulfurous generator 14.

In one embodiment, the control system 16 may further include a sulfur burn rate sensor 82, such as a feed load cell, which determines the weight of sulfur that is present in the sulfur storage bin. The microprocessor-based control system 16 may also include a timer circuit for calculating the feed burn rate based on the change in the output of the feed load cell over time. In addition, the control valve 74 may further include a flow meter for measuring the flow rate of water through the solid-based sulfurous generator 14. Finally, the control system 16 may include a timer for selectively starting and stopping the solid-based sulfurous generator 14.

In one embodiment, the microprocessor-based controller 16 is a single board microprocessor such as those available from Motorola having a Motorola 68HC12, which includes an embedded microchip processor. This may be a single chip solution, which includes onboard RAM, ROM and a real-time clock. Signal conditioning, relay drivers, keypad and display drivers may also be on one board. In addition, a wireless data interface may be connected to a RF 32 port on the control system 16. The wireless data interface may then connect to a conventional third party wireless transmitter for transmitting the RF 32 signal to a remote receiver, such as a central PC (not shown). Similarly, the control system 16 may also include an infrared LED, which allows the operator to walk up with a PDA and download the data that may be stored.

In operation, the outputs of the microprocessor-based controller 16 may be used to actuate relay drivers. For example, relays may control a flow valve to and from the generator 14. Also, the VFD may get a low voltage signal to change the speed of a pump connected to the generator 14. The same outputs may also be used to control the igniter 46 in order to turn on the cal-rod for igniting the sulfur in the burning chamber. Other outputs may be used to turn on a light pole as an indicator that the generator is functioning, is in standby, or is defective. This type of indicator may be particularly useful at sites where it is helpful to see the status of the system from afar so the operator could tell that the system is running because the green light is on, is in standby, is defective, or low on sulfur because the yellow light is on.

In one embodiment, controller 16 may have sixteen analog inputs so that up to sixteen different types of sensors can be monitored. The controller 16 may log the data from many different sensors by taking samples once a minute or some other time interval. The controller 16 may store the data in memory and provide downloads through a wireless data interface, a PDA interface, a display driver or LED, or the like.

The controller 16 may contain a battery-operated, real-time clock chip on the circuit board that stores the time and day whether the unit has power or not-preventing a loss of data during a power failure. Various settings such as targeted pH, generator run times, and start and stop times, may be stored in a non-volatile flash memory. These parameters may be permanently stored in memory and saved even during power loss. The numeric values for the different sensors may be displayed on the seven segment displays.

The software may perform three different functions. First, there is a timer, which may be an event sequencer that knows the time of day and certain events at certain times. The operator interface allows the user to establish set-up functions such as the time of day, the start time, the end time, the generator run time, and the igniter configurations and burn time. Second, the controller 16 may have three different modes which affect the sulfurous generator. The stop mode may prevent it from running, the manual mode may run it for a certain amount of time or indefinitely, and finally, the auto-mode may use the time of day to determine when to start and stop running.

For example, auto-mode may be set to start the sulfurous generator at 11:00 AM. Automode may go through a start-up sequence. It may check the time of day, start the pump, start the igniter 46, burn the igniter 46 for the specified time period (15 seconds for example), check the flow rate and adjust the pump to establish the optimal flow rate. Finally, it may check some parameters to make sure that the temperature in the burning chamber 36 is sufficient for proper combustion. To shut down, it may turn off the flow of water. The hydraulic air inlet valve 47 may then close, cutting off oxygen to the burning chamber which causes combustion to cease. Automode may then re-set itself to start and stop at another pre-determined time.

The controller 16 may also control an injection system for adding nutrients, such as solution-grade gypsum, into the water. This system may include a tank having a solution of materials or fertilizers, which may be injected into the water being treated. There also may be other basic timer controller events (such as aeration or circulation), which use the time of day to start and stop some other device that aerates or circulates the water in a holding tank or pond.

As mentioned, substances other than gypsum may be added by the controller 16 to the treated water discharge system depending on the chemical make-up of the discharged water. For example, ground limestone, potassium sulfate, zinc sulfate, magnesium sulfate, ammonium sulfate, calcium nitrate, UAN-32, humic acid, and iron sulfate may be added individually or in selected combinations to treat, remedy, limit, or correct various, undesirable characteristics that may be found in the water being treated.

Certain modifications and improvements may occur to those skilled in the art upon a reading of the foregoing description. By way of example, while single sulfurous generators according to the present invention may be used in most applications, in some applications it may be advantageous to gang several generators together. This could be advantageous for creating redundancy and additional capacity.

Another modification may be to utilize a large, central storage device to feed sulfur into a single generator or into multiple generators. Also, while the control system may further include a feed-load cell for determining the weight of sulfur, the mass flow of the sulfur could also be determined by ultrasonic or capacitance sensors. These data may then be used to calculate the actual volume of material inside the chamber, to estimate the burn rate and to predict when the sulfur will run out.

Finally, while in one embodiment, a control system 16 may sense the pH of the treated water and provide feedback to adjust the flow rate of water through the generator 14 so the pH of the water being treated increases, decreases or stays the same. The control system 16 may also sense the flow rate of water into the reservoir 12 and provide feedback to adjust the generator 14 output to reduce, increase or maintain the concentration of sulfurous acid in the water being treated. These parameters may also be manually measured and adjusted. It should be understood that there are many modifications and improvements within the scope of the present invention.

The present invention may be embodied in other specific forms without departing from its spirit or essential characteristics. The described embodiments are to be considered in all respects only as illustrative, and not restrictive. All changes which come within the meaning and range of equivalency of the claims are to be embraced within their scope.

What is claimed and desired to be secured by United States Letters Patent is:

1. A water treatment system for treating waste water, the water treatment system comprising:
    a final water treatment station outputting treated water; and
    a solid-based generator outputting aqueous sulfurous acid to the final water treatment station;
    a pump comprising a variable frequency drive, the pump generating a water flow from the final treatment station through the generator, and from the generator back to the final treatment station, the water flow being characterized in a flow rate;
    a pH sensor to ascertain the pH of the treated water discharged from the treatment station; and
    a control system connected to the pH sensor to receive a signal representative of the pH, compare the signal to a set point for a desired pH, and provide an output control signal to the variable frequency drive to vary the water flow rate and thereby control the concentration of sulfurous acid in the treated waste water.

2. The system of claim 1, further comprising a primary water treatment station, a secondary water treatment station to receive and process treated water from the primary water treatment station, and wherein the final water treatment station is a tertiary water treatment station to receive and process water from the secondary water treatment station.

3. A water treatment system for treating water, the water treatment system comprising:
    a final water treatment station outputting treated water;
    a solid-based generator outputting a stream of aqueous sulfurous acid into the treated water, the generator comprising a safety system for automatically closing an air inlet to the generator in the event a water flow through the generator is interrupted, wherein the safety system includes a valve on the air inlet and a hydraulic cylinder connected to the valve, wherein water pressure from said water flow causes the hydraulic cylinder to open the air inlet, and wherein the hydraulic cylinder is arranged to close the valve when said water flow is interrupted; and a control system for monitoring the pH of the treated water to adjust a water flow rate through the generator to achieve a desired concentration of sulfurous acid in the treated water.

4. The system of claim 3, wherein the control system includes a pH sensor for ascertaining the pH of the treated water; a controller connected to the pH sensor for receiving a signal representative of the pH, comparing the signal to a set point for a desired water pH, and providing an output control signal to adjust a flow control means to vary the water flow rate through the generator.

5. The system of claim 4, wherein the flow control means comprises a variable frequency drive to control a pump delivering water to the generator.

6. The system of claim 3, further comprising a primary water treatment station, a secondary water treatment station to receive and process treated water from the primary water treatment station, and wherein the final water treatment station is a tertiary water treatment station to receive and process water from the secondary water treatment station.

7. The system of claim 3, wherein the generator comprises a solid sulfur supply, a burning chamber for burning the solid sulfur supply, and an outlet to output sulfur dioxide gas from the burning chamber.

8. The system of claim 7, further comprising a mixing and collection chamber connected to the outlet.

9. The system of claim 7, wherein the burning chamber further comprises a water-cooled bottom plate for solidifying molten sulfur in the burning chamber to form a seal.

10. The system of claim 9, wherein the water-cooled bottom plate is removable to clean the burning chamber.

11. The system of claim 7, wherein the burning chamber further comprises an igniter.

12. The system of claim 11, wherein the igniter is a cal-rod inserted into the burning chamber.

13. The system of claim 7, further comprising a negative pressure source downstream from the outlet for drawing in gas from the burning chamber and air into the burning chamber through the air inlet.

14. The system of claim 13, further comprising a scrub tower downstream from the outlet to capture sulfur dioxide gas.

15. The system of claim 14, wherein the scrub tower comprises a large reaction surface and a supply of water for reacting the sulfur dioxide gas.

16. The system of claim 15, wherein the large reaction surface is a moisture-resistant material.

17. The system of claim 16, wherein the moisture-resistant material comprises rashing rings formed from plastic tubing.

18. The system of claim 17, wherein the rashing rings have a length between about 0.5 and 1.5 inches and a diameter between about 0.5 and 1.5 inches.

19. The system of claim 15, wherein a water flow rate through the scrub tower is greater than about 80 GPM at greater than about 20 PSI.

20. The system of claim 14, wherein the scrub tower further comprises a vapor recovery means.

21. The system of claim 20, wherein the vapor recovery means comprises an air inlet for providing additional air into the scrub tower, an air mover for removing air and vapors from the scrub tower, and a percolation chamber for receiving and dissipating air and vapors removed from the scrub tower.

22. The system of claim 21, wherein the air mover is a water aspirator.

23. A water treatment system for treating waste water, the water treatment system comprising:

a final water treatment station outputting treated water; and a solid-based generator outputting aqueous sulfurous acid to the final water treatment station;

a pump comprising a variable frequency drive, the pump generating a water flow from the final treatment station through the generator, and from the generator back to the final treatment station.

* * * * *